(No Model.) 2 Sheets—Sheet 1.
C. O. TANGEMAN.
RECEIPT BOOK.
No. 456,862. Patented July 28, 1891.
Fig. 1.
Fig. 2.
Fig. 3.
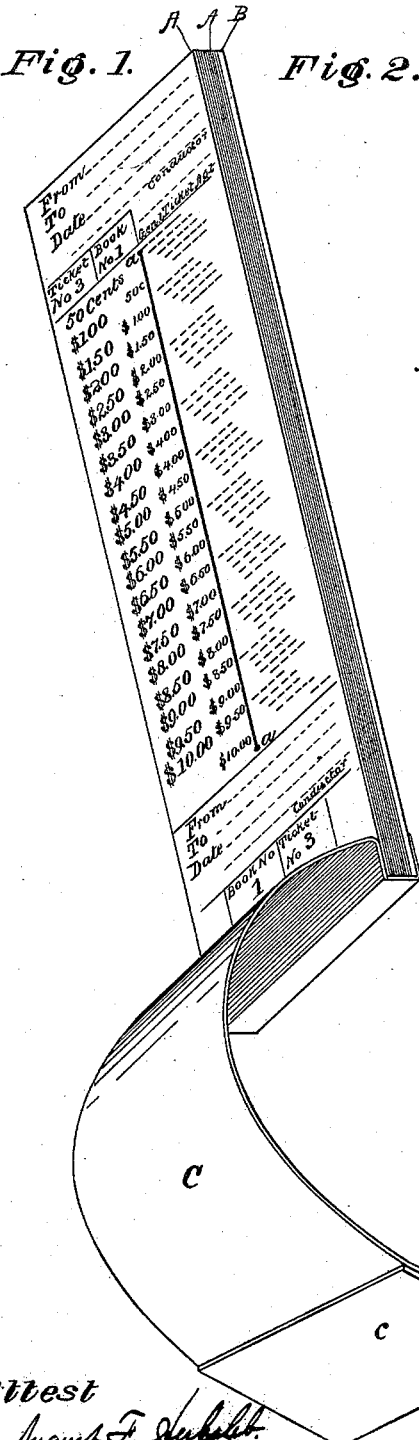
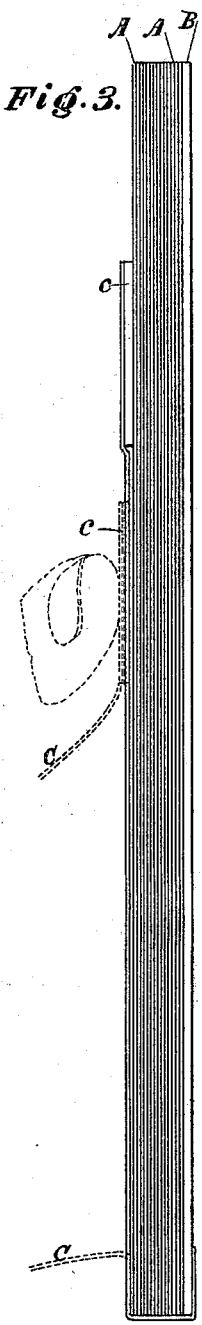
Attest
August F. ...
... Ramsey
Charles O. Tangeman
Inventor
By Parkinson & Parkinson
Attys.
THE NORRIS PETERS CO., PHOTO-LITHO., WASHINGTON, D. C.

(No Model.) 2 Sheets—Sheet 2.
C. O. TANGEMAN.
RECEIPT BOOK.
No. 456,862. Patented July 28, 1891.
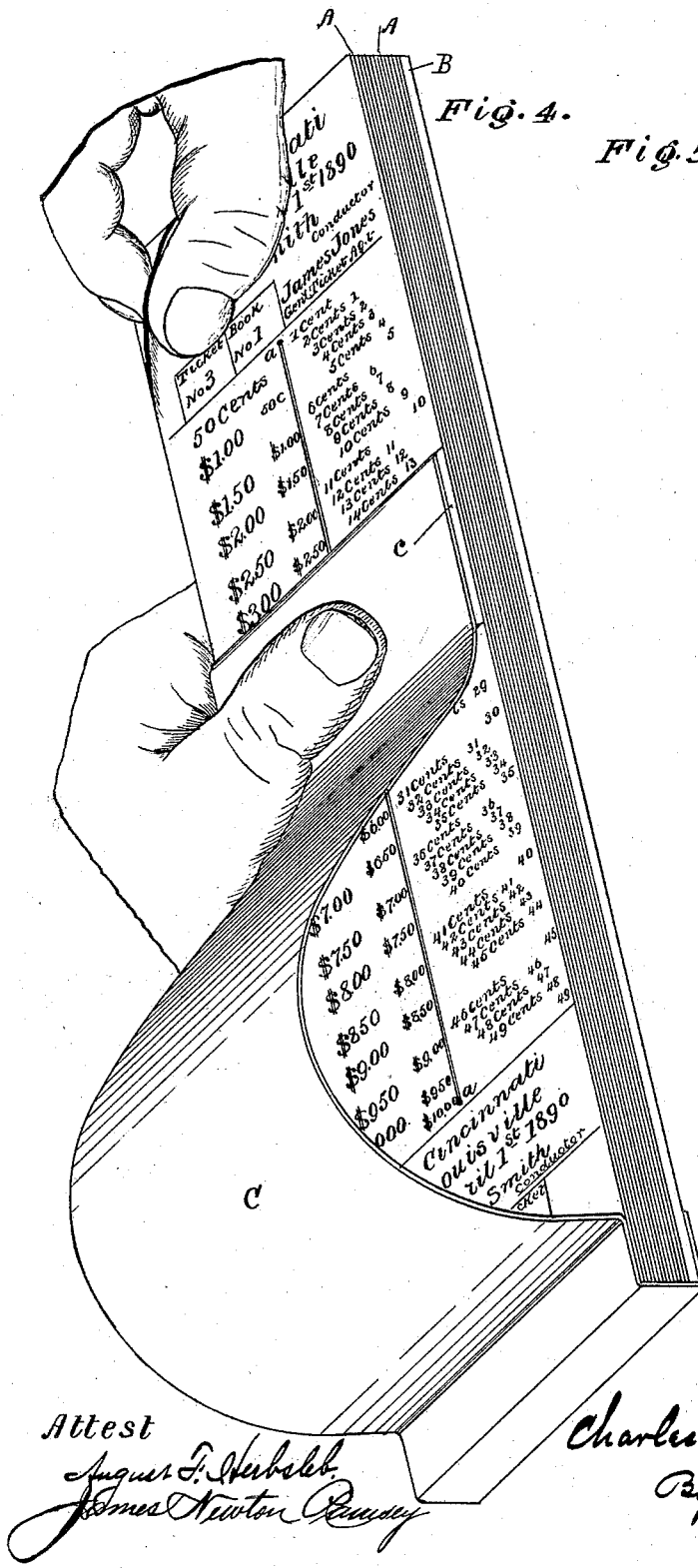
Attest
August F. Herbslef.
James Newton Ramdey
Charles O. Tangeman, Inventor
By Parkinson & Parkinson
Att'ys.

UNITED STATES PATENT OFFICE.

CHARLES O. TANGEMAN, OF FERN BANK, OHIO.

RECEIPT-BOOK.

SPECIFICATION forming part of Letters Patent No. 456,862, dated July 28, 1891.

Application filed April 12, 1890. Serial No. 347,708. (No model.)

*To all whom it may concern:*

Be it known that I, CHARLES O. TANGEMAN, a citizen of the United States, residing at Fern Bank, in the county of Hamilton and State of Ohio, have invented a certain new and useful Improvement in Receipt-Books, of which the following is a specification.

My invention is especially applicable to conductors' cash-fare receipts or tickets, but is adapted for any kind of receipt, check, or ticket which may be made out from prepared forms by detaching portions thereof. The conductor's cash-fare receipts or checks and receipts, checks, or tickets for analogous purposes now in use generally require considerable writing or punching, or both, involving labor and loss of time.

The object of my invention is to provide a simple and convenient book or pad of prepared forms which will enable the user to quickly and conveniently make out a check or receipt by detaching a portion of the form and to provide means whereby the detachment of a check or receipt will leave a record showing the nature of the check or the amount receipted for.

My invention consists in a novel slip for the check or receipt forms; in a novel arrangement of the matter upon the slips, and in the combination and arrangement of a series of these slips in book or pad form in such manner as to facilitate detachment of checks, receipts, or tickets of the desired kind or amount.

I have illustrated my invention as applied to conductors' cash-fare checks or receipts.

In the drawings, Figure 1 is a perspective view of a book or pad of forms for cash-fare receipts embodying my invention. Fig. 2 is a front view of one of the form-slips; Fig. 3, a longitudinal section of one of the books; Fig. 4, a perspective view showing the method of detaching a receipt, and Fig. 5 a front view showing a detached receipt and the stub or remainder of the form.

A A represent a series of slips of paper or other suitable material, each having a longitudinal slit $a$ $a$ and preferably having its ends intact. Upon each side of the slit is arranged a double series of characters representing sums of money. Upon one side the sums shown range from fifty cents to ten dollars in multiples of fifty cents, both series or columns representing the same sums. The amounts in one column are arranged sufficiently below the corresponding amounts in the other column to permit the uppermost to be removed by dividing the slip upon a line at right angles to its length without removing the lower, which will be next in order in its column, and upon the other side of the slit the sums shown range from one to forty-nine cents, the figures being duplicated and arranged as above described. Any desired number of these form-slips are tacked together at one end and provided with a bottom or backing B, of card-board or other suitable material, and a flexible top cover C, having at its free end a strip $c$, of card-board or other suitable material, serving to form a straight edge. In using the slips the straight edge is slipped down the form until it exposes the desired amount in the first column—three dollars, for instance. The user then takes hold of the free end of the fare-slip with one hand and, pressing the slip $e$ against it with the other, tears the slip along the straight edge from the left side to the slit. The straight edge is then slipped up or down until the desired amount is exposed upon the other side of the slit—twenty-five cents, for instance—and that side of the slip is torn across along the straight edge, thus completely severing the slip. It will be seen that the left-hand column upon each side of the slit upon the detached receipt will give the amount of the receipt, while the right-hand columns upon the stub or remainder of the slip will also give the amount, thus enabling the auditing officer to readily check off the amounts from the stubs. It is obvious that a series of perforations may be used in place of the slit.

I am aware that a ticket has been provided with a longitudinal line of perforations and lines of perforations extending laterally from the longitudinal line, and to such construction I lay no claim. My plan differs from this in that I dispense with the laterally-extending perforations, thereby obviating the liability of the accidental detachment of the exposed ends of the stub and detached receipt.

I claim as my invention—

1. The receipt-book herein described and shown, comprising a series of form-slips having a longitudinal slit and provided on one side of the slit with duplicate columns of characters representing sums of money and upon the other side of the slit with duplicate columns of characters representing sums of money of another value, the characters in one column being arranged one step below those of the corresponding column, said slips being bound together at one edge with a flexible cover having a straight edge adapted to be moved freely along the slips.

2. The combination, with a pad or book of slips, of a flexible top or cover provided with a straight edge adapted to be freely moved along the slips throughout their lengths.

3. The combination of a pad of slitted form-slips with a flexible top or cover provided with a straight edge adjustable upon the form-slips in the line of their length, substantially as and for the purpose specified.

CHARLES O. TANGEMAN.

Witnesses:
JAMES N. RAMSEY,
AUGUST F. HERBSLEB.